(12) United States Patent
Yamada et al.

(10) Patent No.: US 9,764,761 B2
(45) Date of Patent: Sep. 19, 2017

(54) WORK VEHICLE HAVING ENGINE AND HYDRAULIC STEPLESS SPEED CHANGING DEVICE

(71) Applicant: KUBOTA CORPORATION, Osaka (JP)

(72) Inventors: Masahiro Yamada, Norcross, GA (US); Barry Jordan, Toccoa, GA (US); David Spitz, Atlanta, GA (US)

(73) Assignee: KUBOTA CORPORATION, Osaka (JP)

( * ) Notice: Subject to any disclaimer, the term of this patent is extended or adjusted under 35 U.S.C. 154(b) by 45 days.

(21) Appl. No.: 15/019,267

(22) Filed: Feb. 9, 2016

(65) Prior Publication Data

US 2017/0225709 A1    Aug. 10, 2017

(51) Int. Cl.
*A01D 34/54* (2006.01)
*B62D 11/18* (2006.01)
*B60K 17/10* (2006.01)
*F16H 47/00* (2006.01)

(52) U.S. Cl.
CPC .............. *B62D 11/18* (2013.01); *B60K 17/10* (2013.01); *A01D 34/54* (2013.01); *F16H 47/00* (2013.01)

(58) Field of Classification Search
CPC ...... A01D 34/54; B60K 15/06; B60K 15/063; B60K 15/067; B60K 15/03177; B60K 15/00; B60K 17/10; B60K 17/00; B62D 11/18; B62D 11/183; B62D 49/06; B62D 49/08; B62D 63/00; B62J 35/00; F16H 37/086; F16H 47/00; F16H 47/065
USPC ................. 56/1, 11.9, 10.8, 11.1, 14.7, 17.1; 137/587, 590; 180/6.48, 6.62, 6.44, 6.7, 180/291, 311, 312, 314; 280/782, 834; 475/66, 70
See application file for complete search history.

(56) References Cited

U.S. PATENT DOCUMENTS

| | | | | |
|---|---|---|---|---|
| 4,741,362 A | * | 5/1988 | Smola | B60K 15/00 137/587 |
| 5,194,052 A | * | 3/1993 | Ueda | F16H 37/086 475/66 |
| 5,255,752 A | * | 10/1993 | Nakamura | B60K 5/02 180/291 |
| 5,924,514 A | * | 7/1999 | Bullerdick | B60K 15/06 180/314 |
| 6,454,032 B1 | * | 9/2002 | Teal | B62D 11/183 180/6.44 |
| 6,935,457 B2 | * | 8/2005 | Tsuda | B62D 49/06 180/312 |
| 8,690,190 B2 | | 4/2014 | Spitz et al. | |
| 9,180,776 B2 | * | 11/2015 | Spitz | B60K 15/06 |

* cited by examiner

*Primary Examiner* — Robert Pezzuto
(74) *Attorney, Agent, or Firm* — Greenblum & Bernstein, P.L.C.

(57) ABSTRACT

A work vehicle includes a driver's seat supported to a frame unit, a first hydraulic stepless speed changing device transmitting power to a first drive wheel, a second hydraulic stepless speed changing device transmitting power to a second drive wheel, and an oil tank. A bridge beam extending in a vehicle body transverse direction is provided between a cable harness extending in the vehicle body transverse direction and a hydraulic passage connecting the second hydraulic stepless speed changing device to the oil tank.

9 Claims, 7 Drawing Sheets

WORK VEHICLE HAVING ENGINE AND HYDRAULIC STEPLESS SPEED CHANGING DEVICE

TECHNICAL FIELD

The disclosure relates to a work vehicle having a left hydraulic stepless speed changing device configured to speed-change power from an engine and transmit the speed-changed power to a left drive wheel and a right hydraulic stepless speed changing device configured to speed-change power from the engine and transmit the speed-changed power to a right drive wheel.

BACKGROUND ART

A grass mower according to U.S. Pat. No. 8,690,190 includes a vehicle body frame extending between a left rear wheel and a right rear wheel, an engine mounted rearwardly of a driver's seat, a fuel tank disposed downwardly of the driver's seat, a left hydraulic stepless speed changing device for transmitting drive power to the left rear wheel, and a right hydraulic stepless speed changing device for transmitting drive power to the right rear wheel. For improvement of front-rear balance of the vehicle body, the engine needs to be disposed as forwardly as possible. As a result, the distance between the driver's seat and the engine is set small. In the periphery of the driver's seat, there are disposed various electric operating tools, sensors, display units, etc. Further, there are present in a mixed state, a cable harness combining multiple signal cables (lines) for transmitting electric signals from such operating tools and sensors to a controller and signal lines for sending electric signals from the controller to the operating devices or the displaying units as well as a hydraulic hose connecting between the hydraulic stepless speed changing device and the oil tank. If interference occurs between the cable harness and the hydraulic hose, trouble or difficulty will be encountered in assembly or maintenance.

Thus, there is a need to arrange a fuel tank, an engine, a hydraulic stepless speed changing device and an oil tank for the hydraulic stepless speed changing device with good balance downwardly or rearwardly of the driver's seat so as to effectively avoid entanglement between pipes of the hydraulic stepless speed changing device and the cable harness.

SUMMARY OF THE INVENTION

A work vehicle according to the present invention comprises:
a frame unit extending along a vehicle body front-rear direction;
a first drive wheel mounted to the frame unit on one side in a vehicle body transverse direction;
a second drive wheel mounted to the frame unit on the other side in the vehicle body transverse direction;
a driver's seat supported to the frame unit;
a first hydraulic stepless speed changing device mounted to the frame unit on one side in the vehicle body transverse direction and configured to transmit power to the first drive wheel;
a second hydraulic stepless speed changing device mounted to the frame unit on the other side in the vehicle body transverse direction and configured to transmit power to the second drive wheel;
an engine mounted to the frame unit rearwardly of the driver's seat;
a battery mounted to the frame unit rearwardly of the driver's seat;
a fuel tank mounted to the frame unit downwardly of the driver's seat;
a hydraulic stepless speed changing device oil tank mounted to the frame unit on one side in the vehicle body transverse direction;
a first hydraulic passage connecting the hydraulic stepless speed changing device oil tank to the first hydraulic stepless speed changing device;
a second hydraulic passage extending from one side to the other side of the frame unit in the vehicle body transverse direction, thus connecting the hydraulic stepless speed changing device oil tank to the second hydraulic stepless speed changing device;
a cable harness extending from one side to the other side of the frame unit in the vehicle body transverse direction along the second hydraulic passage; and a bridge beam extending from one side to the other side of the frame unit in the vehicle body transverse direction between the second hydraulic passage and an electric wiring.

According to the above-described configuration, a portion extending in the vehicle body transverse direction of the second hydraulic passage (constituted of a hydraulic hose or a hydraulic pipe, etc.) that connects the second hydraulic stepless speed changing device disposed opposite the hydraulic stepless speed changing device oil tank in the vehicle body transverse direction and this hydraulic stepless speed changing device oil tank is separated by the bridge beam from the portion of the cable harness extending to transverse the vehicle body. With this arrangement, no interference occurs between the second hydraulic passage and the cable harness, so that the assembly and maintenance operations thereof are facilitated. Advantageously, the arrangement serves also to prevent damage due to such interference, if any, between the second hydraulic passage and the cable harness.

According to one preferred embodiment, the bridge beam comprises a plate member as one of cross beams constituting the frame unit. With this arrangement, by retaining the cable harness to one face of the bridge beam and retaining the second hydraulic passage to the other face thereof, the separation between the second hydraulic passage and the cable harness is made more reliable.

According to a further preferred embodiment, the engine and the battery are disposed side by side in the vehicle body transverse direction. This arrangement allows layout which places the combined gravity center of the engine and the battery together at the center of the vehicle body, thus improving the vehicle body balance. Still preferably, an oil supply cylinder communicated to the fuel tank is disposed on the other side of the frame unit in the vehicle body transverse direction and an oil supply opening of the oil supply cylinder is disposed laterally of the driver's seat. With this, the hydraulic stepless speed changing device oil tank and the oil supply cylinder are disposed at the opposed regions in the vehicle body transverse direction, so that an oil supplying position to the oil tank and an oil supplying position to the fuel tank will be placed wide apart from each other, whereby confusion therebetween will be inhibited.

DESCRIPTION OF EMBODIMENTS

Prior to explanation of a specific embodiment of a work vehicle according to the present invention, with reference to FIG. 1, there will be described first a basic arrangement of constituent members provided in a vehicle body rear portion including a driver's seat employed in this work vehicle. Incidentally, in this detailed disclosure, a direction along a vehicle body front-rear centerline CL of the work vehicle (traveling direction) will be referred to simply as the "front-rear direction". Further, a direction along the vehicle body width will be referred to as ether the "vehicle body transverse direction" or simply as the "transverse direction" or the "left-right direction" '(right, left). And, a direction perpendicular to the ground surface will be referred to as the "vertical direction" (upper side, lower side).

Figure 1:
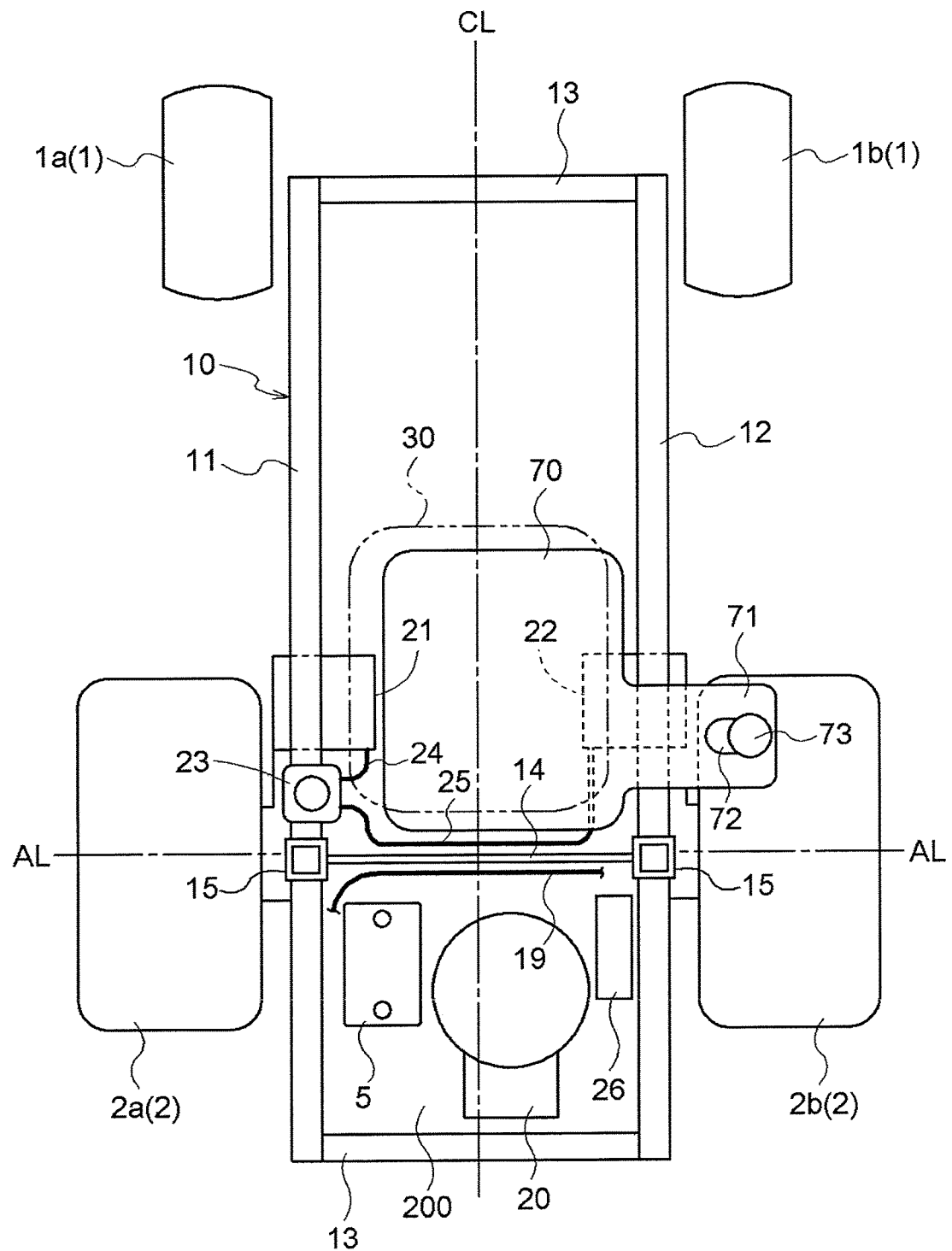
FIG. 1 is a schematic showing features of a work vehicle according to the present invention.
Figure 2:
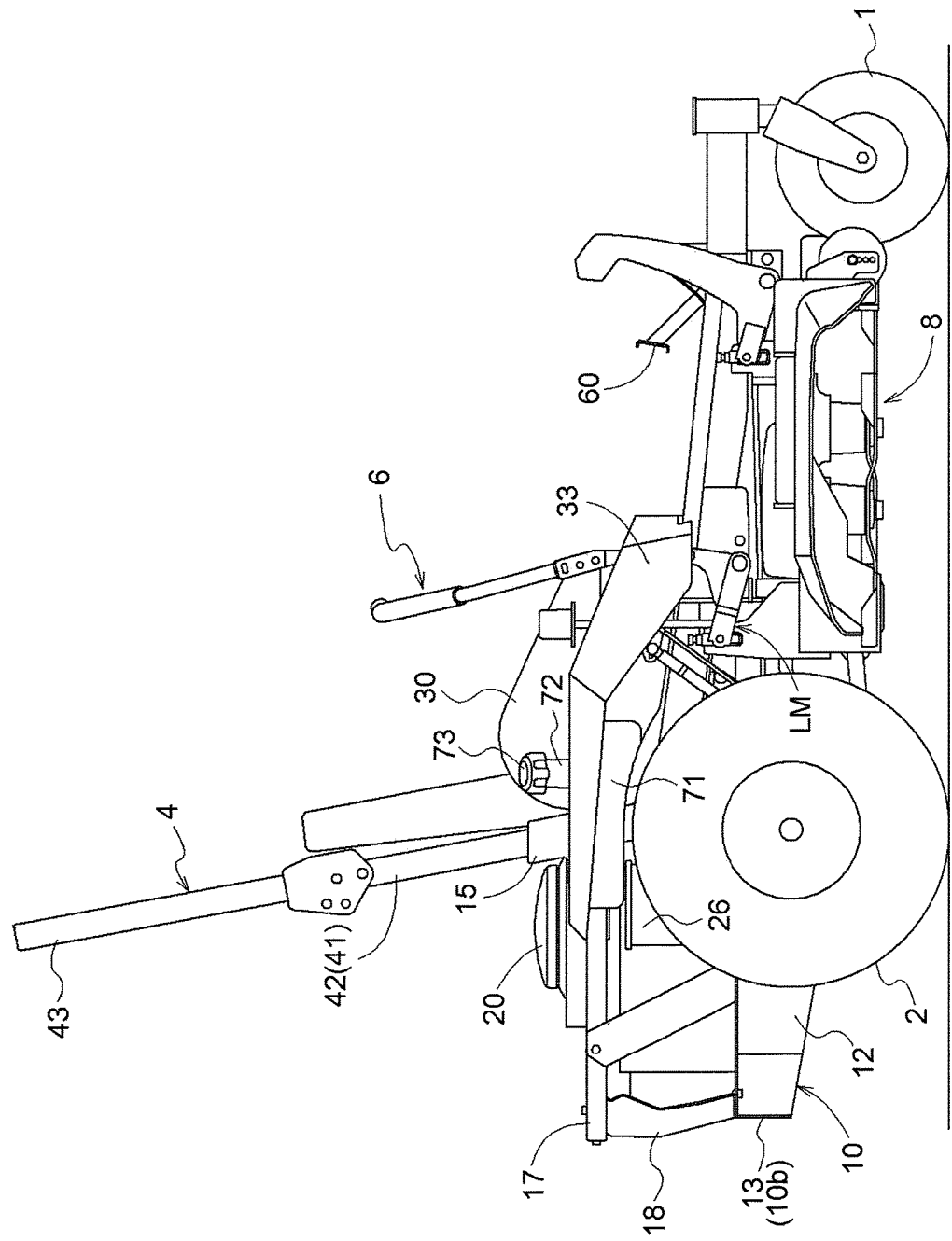
FIG. 2 is a side view showing a zero-turn mower.
Figure 3:
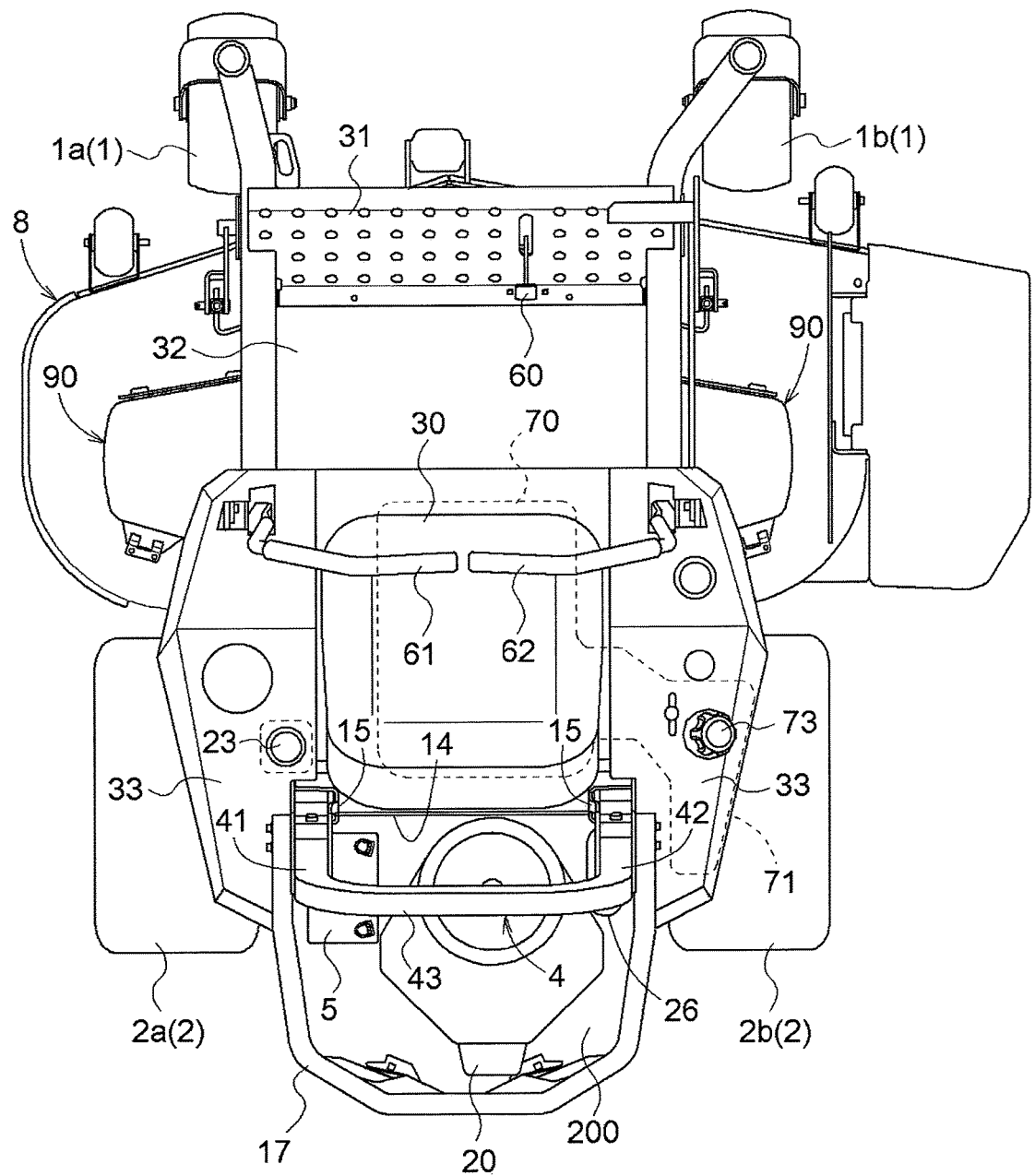
FIG. 3 is a plane view of the zero-turn mower.

A work vehicle schematically illustrated in FIG. 1 includes a frame unit 10 that is supported on the ground surface via a front wheel unit 1 which is a free wheel unit and a rear wheel unit 2 which is a drive wheel unit. The front wheel unit 1 includes a left front wheel 1a and a right front wheel 1b. The rear wheel unit 2 includes a left rear wheel 2a and a right rear wheel 2b. The frame unit 10 includes a plate-like left longitudinal frame 11 and a plate-like right longitudinal frame 12 which extend in the vehicle body front-rear direction. The left longitudinal frame 11 and the right longitudinal frame 12 are connected to each other via cross beams 13.

At an approximate center of the frame unit 11 with respect to the vehicle body front-rear direction, a fuel tank 70 is mounted. And, a driver's seat 30 is mounted in such a manner as to cover this fuel tank 70 from above. Forwardly of an axle center AL of the rear wheel unit 2, a first hydraulic stepless speed changing device 21 is attached to the left longitudinal fame 11 and a second hydraulic stepless speed changing device 22 is attached to the right longitudinal frame 12. Rearwardly of the driver's seat 30, an engine 20 is mounted to the frame unit 10. A bridge beam 14 extends between the driver's seat 30 and the engine 20 along the vehicle body transverse direction to bridge between the left longitudinal frame 11 and the right longitudinal frame 12. A support body 15 connects a left end of the bridge beam 14 with the left longitudinal frame 11 and another support body 15 connects a right end of the bridge beam 14 with the right longitudinal frame 12. On the left side of the engine 20, a battery 5 is mounted. On the right side of the engine 20, a canister 26 is mounted. Forwardly of the engine 20 and on the left side of the driver's seat 30, a stepless hydraulic speed changing device oil tank 23 is mounted. Power from the engine 20 is branched into left power and right power, so that the left power is transmitted to the left rear wheel 2a via the first hydraulic stepless speed changing device 21 and the right power is transmitted to the right rear wheel 2b via the second hydraulic stepless speed changing device 22.

Oil is supplied from the hydraulic stepless speed changing device oil tank 23 to the first hydraulic stepless speed changing device 21 via a first hydraulic passage 24. Since the first hydraulic stepless speed changing device 21 is disposed near the hydraulic stepless speed changing device oil tank 23, the first hydraulic passage 24 has a short length. Whereas, since the second hydraulic stepless speed changing device 22 is disposed opposite the hydraulic stepless speed changing device oil tank 23 with respect to the vehicle body transverse direction, the second hydraulic passage 25 has a long length extending between the left longitudinal frame 11 and the right longitudinal frame 12. The second hydraulic passage 25 can be constituted of a hydraulic hose or a hydraulic pipe. In this regard, for avoiding interference with any other device or member resulting from vibration or pivotal displacement thereof, this second hydraulic passage 25 extends along one face of the bridge beam 14 and is retained to this face. Along the other face of the bridge beam 14, a cable harness 19 extends and is retained to this face. With these arrangements, interference between the second hydraulic passage 25 and the cable harness 19 can be avoided reliably.

From the fuel tank 70, an extension portion 71 extends toward right upper outer side. And, on the upper face of this extension portion 71, an oil supply cylinder 72 is provided. An upper end of this oil supply cylinder 72 functions as an oil supply (oil filling) opening, and an oil supply cap 73 is fitted thereon. The oil supply opening is disposed on a lateral side of a seat cushion of the driver's seat 30.

Next, a specific embodiment of the present invention will be described with reference to the accompanying drawings. In this example, the work vehicle relating to the present invention, as may be understood from FIGS. 2 through 5 illustrations, is a mid-mount type riding mower (to be referred to simply as the "mower" hereinafter) having the frame unit 10 supported by the front wheel unit (may sometimes be referred to simply as the "front wheels" hereinafter) 1 consisting of the left front wheel 1a and the right front wheel 1b and the rear wheel unit (may sometimes be referred to simply as the "rear wheels" hereinafter) 2 consisting of the left rear wheel 2a and the right rear wheel 2b. This riding mower is called also "zero-turn mower", with its left rear wheel 2a and the right rear wheel 2b being independently controllable in their forward and reverse speeds. Incidentally, the present invention is applicable not only to the above-described mid-mount riding mower, but also to a front-mower type mower, or any other work vehicles other than mowers.

The major constituent component of the vehicle body is the frame unit 10 that extends in the vehicle body front-rear direction. This frame unit 10 consists of the left longitudinal frame 11, the right longitudinal frame 12, and the plurality of cross beams 13 connecting the left longitudinal frame 11 with the right longitudinal frame 12. Between the front wheels 1 and the rear wheels 2, a mower unit 8 is suspended from the frame unit 10 via a link mechanism LM to be lifted up/down. The link mechanism LM provides a function of lifting up/down the mower unit 8 horizontally in response to a pedal operation or a lever operation.

At a front region of the frame unit 10, there is mounted an access step 31 made of a plate metal disposed to cover this front region approximately entirely from above. The access step 31 has its front portion bent to provide a forwardly inclined face and a horizontal face continuous therefrom. On this horizontal face, a rubber mat 32 is placed and at the center of the inclined face, there is disposed a brake pedal 60 which is urged to return to its non-braking position. The driver's seat 30 is disposed rearwardly of the access step 31 at a level one step higher than this access step 31. On the left and right sides of the driver's seat 30, fenders 33 are disposed. On the upper faces of the fenders 33, there are disposed various control levers, control buttons, etc. On the opposed sides of the driver's seat 30, there is disposed a maneuvering control unit 6 consisting essentially of a left speed changing lever 61 and a right speed changing lever 62.

Figure 5:
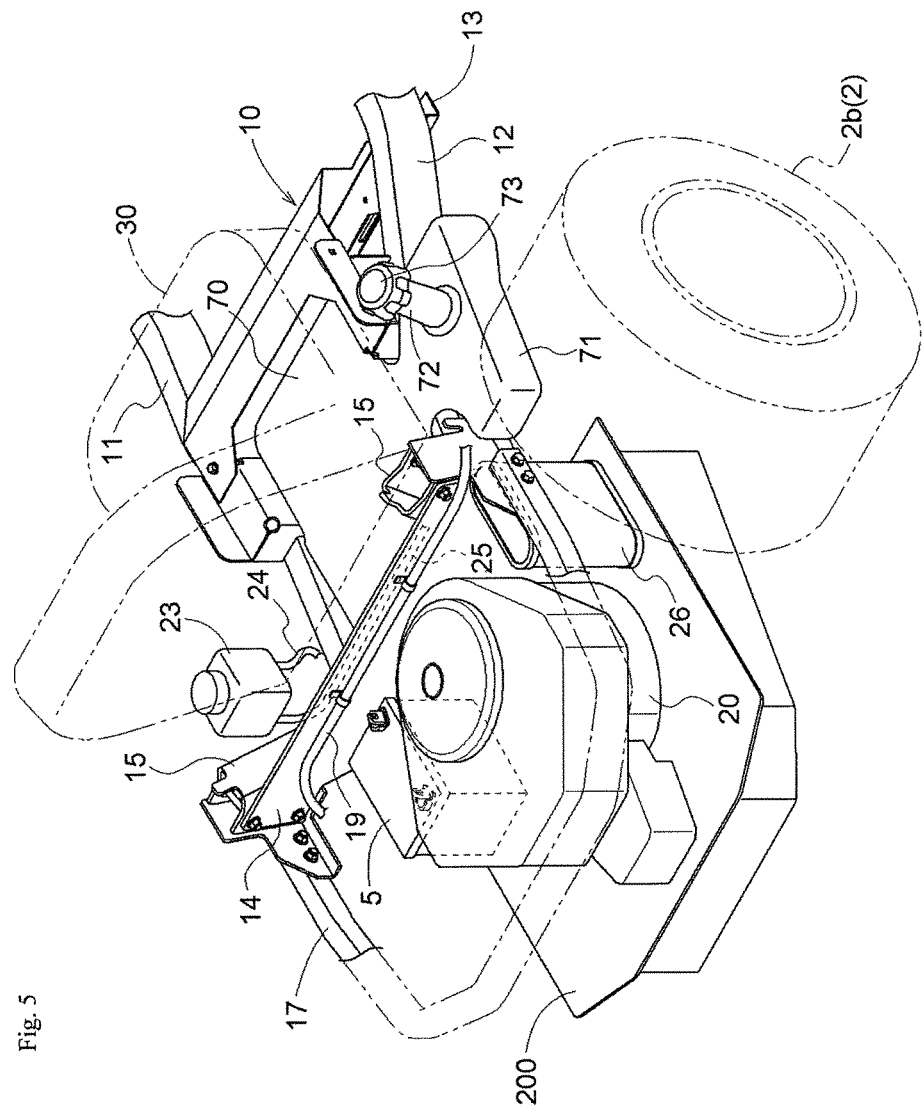
FIG. 5 is a perspective view showing the rear portion of the zero-turn mower.

Rearwardly of the driver' seat 30, there is disposed erect an arch-shaped ROPS 4. The ROPS 4 formed of angular pipes includes a left leg portion 41, a right leg portion 42, and an arch portion 43 connecting the left leg portion 41 with the right leg portion 42. A base end of the left leg portion 41 is connected to the left longitudinal frame 11 and a base end potion of the right leg portion 42 is connected to the right longitudinal frame 12. Further, rearwardly of the driver's seat 30, there is provided the bridge beam 14 that extends in the vehicle body transverse direction to connect the respective end portions to the left leg portion 41 and the right leg portion 42. As shown in FIG. 5, in this embodiment, the bridge beam 14 is a plate member with one face thereof oriented towards the front side of the vehicle body and the other face thereof oriented towards the rear side of the vehicle body. The bridge beam 14, in this embodiment, is connected to the frame unit 10 via the left leg portion 41 and the right leg portion 42.

Rearwardly of the driver's seat 30, there is delimited a substantially horizontal mounting face 200 on which the engine 20 and engine assisting components are mounted. In this embodiment, the rear-most cross beam 13 is formed integral with respective rear portions of the left longitudinal frame 11 and the right longitudinal frame 12, thus constituting a rear frame portion 10b having an arch-shape as seen in its plane view. So that, this rear frame portion 10b and the bridge beam 14 together delimit the mounting face 200. A vertical post 18 is disposed erect spaced with a predetermined distance from the upper portion of the rear frame portion 10b, and to the upper end of this vertical post 18, there is attached a fence member 17 having a shape similar to the contour of the rear frame portion 10b.

On the mounting face 200, the gasoline engine 20 is disposed under a posture with its output shaft 20a protruding downwards and at a position slightly offset to the right side from the vehicle body front-rear centerline CL. The battery 5 is disposed at the space created at a left region of the mounting face 200 resulting from the above-described rightward offset layout of the engine 20 and also the canister 26 is disposed at the gap created on the right side of the engine 20.

Figure 4:
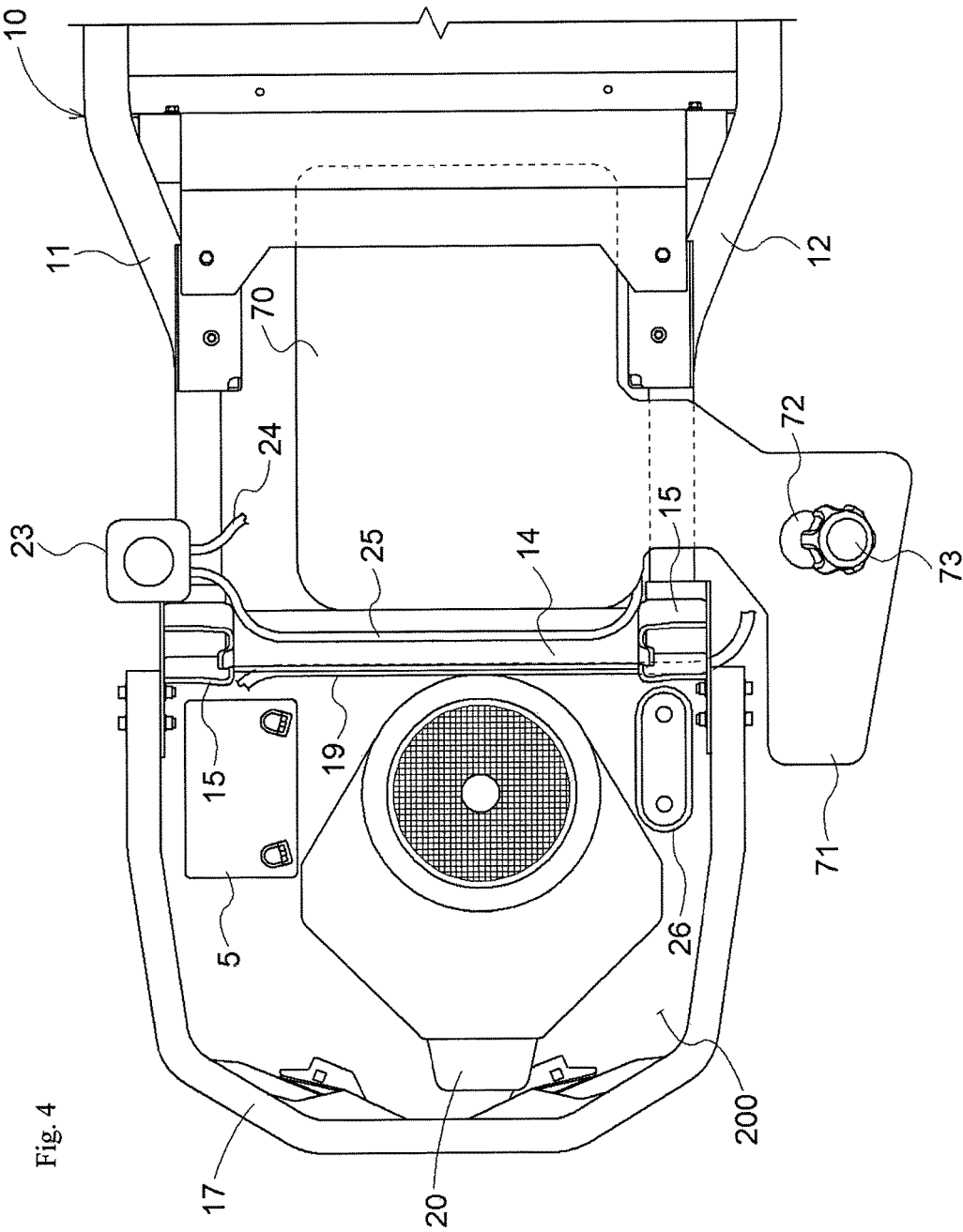
FIG. 4 is a plane view showing a rear portion of the zero-turn mower.

As shown in FIG. 4, downwardly of the driver's seat 30, there is disposed the fuel tank 70 having a generally rectangular parallelepiped shape. Further, from this fuel tank 70, the extension portion 71 extends beyond the right longitudinal frame 12. On the upper face of this extension portion 71, the oil supply cylinder 72 is provided. The oil supply cylinder 72 extends upwards so as to place its opening at the same height level as the seat cushion of the driver's seat 30.

Figure 6:
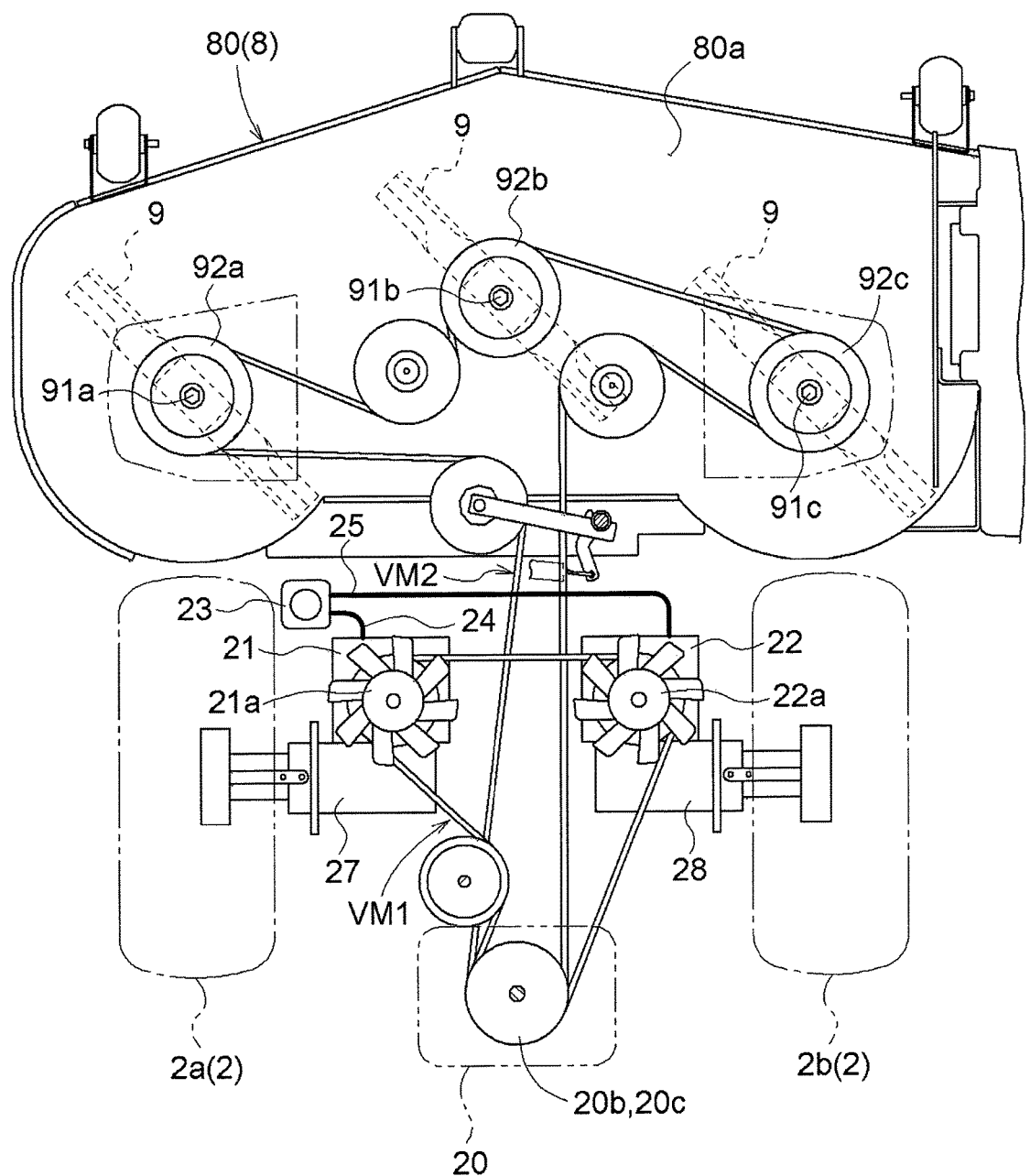
FIG. 6 is a power transmission system diagram of the zero-turn mower.

As shown in FIG. 6, downwardly of the frame unit 10, there is disposed a first belt transmission mechanism VM1 for transmitting power of the engine 20 to the rear wheels 2. There are also provided the first hydraulic stepless speed changing device 21 and a first gear transmission mechanism 27 for transmitting power to the left rear wheel 2a as well as the second hydraulic stepless speed changing device 22 and a second gear transmission mechanism 28 for transmitting power to the right rear wheel 2b. The first hydraulic stepless speed changing device 21 and the second hydraulic stepless speed changing device 22 comprise HST's (hydrostatic transmissions). A length of belt of the first belt transmission mechanism VM1 is entrained around an output pulley 20b attached to the output shaft 20a of the engine 20, an input pulley 21a of the first hydraulic stepless speed changing device 21 and an input pulley 22a of the second hydraulic stepless speed changing device 22. A speed changing shaft (not shown) of the first hydraulic stepless speed changing device 21 is operatively linked via a link mechanism (not shown) for its speed change in response to a pivotal operation of the left speed changing lever 61 in the front-rear direction. A speed changing shaft (not shown) of the second hydraulic stepless speed changing device 22 is operatively linked via a link mechanism (not shown) for its speed change in response to a pivotal operation of the right speed changing lever 62 in the front-rear direction.

With the above-described configuration in operation, when the left speed changing lever 61 or the right speed changing lever 62 is pivoted in the front-rear direction, the corresponding hydraulic stepless speed changing device can be speed-changed, whereby the left rear wheel 2a or the right rear wheel 2b can be driven at the changed speed in an independent manner. That is, with this mower, the front wheels 1 are configured to be steerable and drivable and also the rear wheels 2 are configured to be speed-changeable independently. Thus, it is possible to selectively realize as desired a stopped state in which the left rear wheel 2a and the right rear wheel 2b are stopped, a straight traveling state in which the left rear wheel 2a and the right rear wheel 2b are driven in the forward or reverse direction at a same speed, a gentle turning state in which the left rear wheel 2a and the right rear wheel 2b are driven in the forward or reverse direction at different speeds, a pivot turning state in which one of the left rear wheel 2a and the right rear wheel 2b is stopped and the other is driven in the forward or reverse direction and a pin turning state in which one of the left rear wheel 2a and the right rear wheel 2b is driven in the forward direction and the other is driven in the reverse direction.

As shown in FIG. 6, the hydraulic stepless speed changing device oil tank 23 is disposed near the first hydraulic stepless speed changing device 21. The hydraulic stepless speed changing device oil tank 23 and the first hydraulic stepless speed changing device 21 are connected to each other via the first hydraulic passage 24 constituted of a short hydraulic hose. The hydraulic stepless speed changing device oil tank 23 and the second hydraulic stepless speed changing device 22 are connected to each other via the second hydraulic passage 25 constituted of a long hydraulic hose. As shown in FIG. 5, the second hydraulic passage 25 extends along the rear plate face of the bridge beam 14 constituted of a plate member and is retained to this bridge beam 14 via a clamp. Further, the cable harness 19 connecting the unillustrated control unit and the battery with the control buttons or control switches is caused to extend along the front plate face of the bridge beam 14 constituted of the plate member and is retained to the bridge beam 14 via a clamping member, as shown in FIG. 4. Incidentally, the second hydraulic passage 25 is disposed on the front plate face of the bridge beam 14 and the cable harness 19 is disposed on the rear plate face of the bridge beam 14.

As shown in FIG. 6, a second belt transmission mechanism VM2 for transmitting the power of the engine 20 to the mower unit 8 is disposed downwardly of the frame unit 10. In FIG. 6, as shown by dot lines, inside the mower deck 80, there are disposed three blades 9 side by side in the vehicle body transverse direction. The left blade 9 is fixed to a first blade shaft 91a, the center blade 9 is fixed to a second blade shaft 91*b*, an the left blade 9 is fixed to a third blade shaft 91*c*. The first blade shaft 91*a*, the second blade shaft 91*b*, and the third blade shaft 91*c* extend upward through the mower deck 80, with a first pulley 92*a*, a second pulley 92*b*. and a third pulley 92*c* being attached to the respective upper ends thereof. The first pulley 92*a*, the second pulley 92*b* and the third pulley 92*c* are driven by the second belt transmission mechanism VM2.

Figure 7:
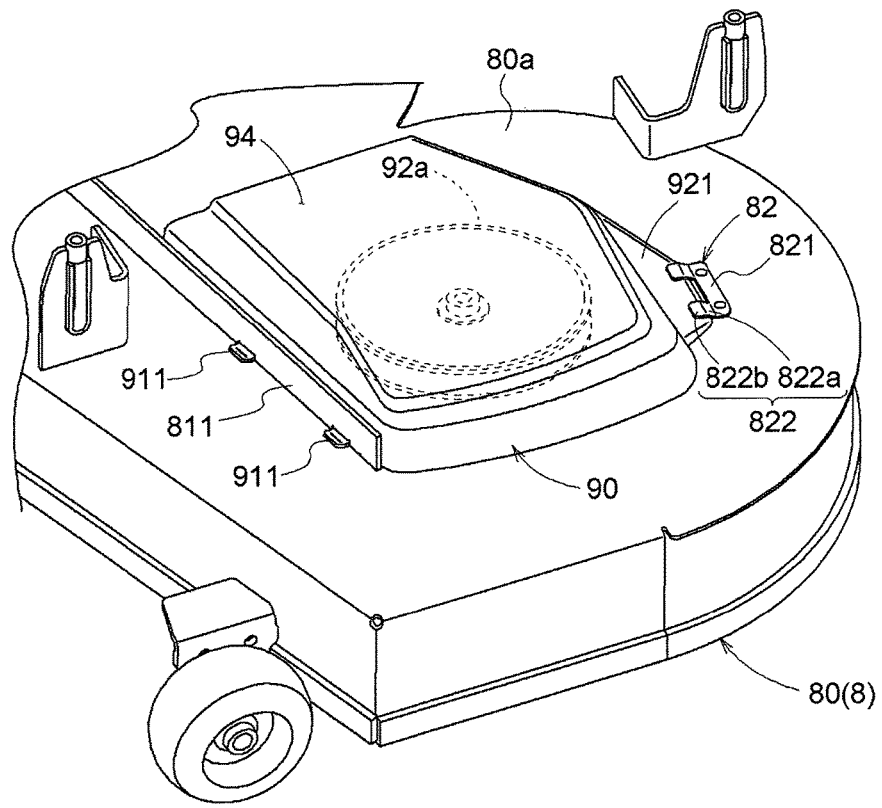
FIG. 7 is a perspective view showing a pulley cover of a mower unit.
Figure 8:
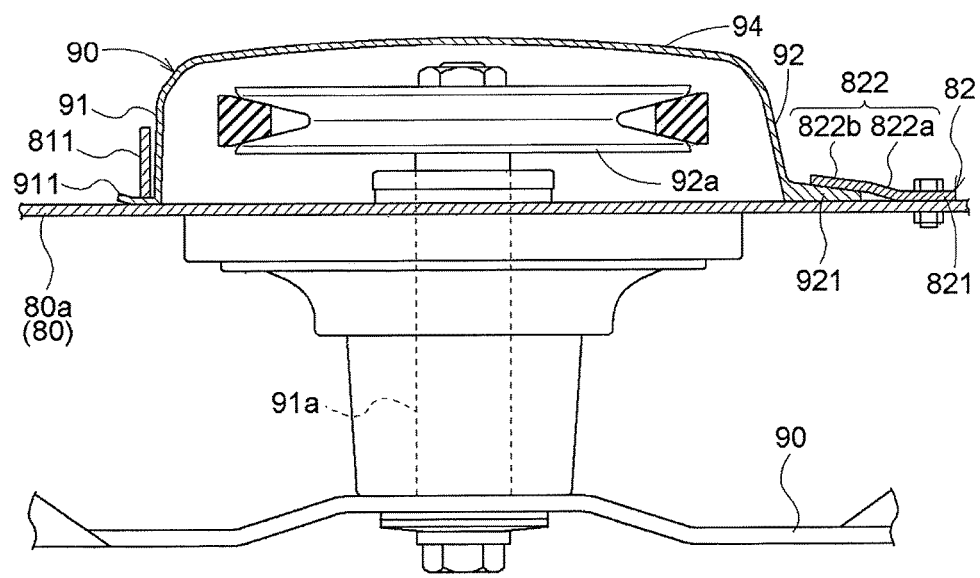
FIG. 8 is a partial vertical section view showing a pulley and the pulley cover of the mower unit.

Next, with reference to FIG. 7 and FIG. 8, there will be explained an attaching arrangement of a cover 90 to be detachably attached to a top plate 80*a* of the mower deck 80 so as to cover the first pulley 92*a* or the third pulley 92*c*. As attaching tools for attaching the cover 90 to the mower deck 80, a first bracket 81 and a second bracket 82 are fixed by welding, bolts or the like to the top plate 80*a* of the mower deck 80. The first bracket 81 and the second bracket 82 are disposed with a spacing therebetween in the front-rear direction so as to sandwich the first pulley 92*a* or the third pulley 92*c* therebetween.

The cover 90 has a shape similar to a flat-bottomed dish and includes an upper face portion 94 as a ceiling, a first skirt portion 91 as a front lateral wall, a second skirt portion 92 as a rear lateral wall, and a third skirt portion 93 as a lateral outer circumferential wall and a lateral inner circumferential wall thereof is largely cut away to allow passage of the belt of the second belt transmission mechanism VM2.

For allowing detachable and tool-less attachment of the cover 90 to the mower deck 90, attaching profiles are formed between the first bracket 81 and the cover 90 and between the second bracket 82 and the cover 90, respectively. As such attaching profile between the first bracket 81 and the cover 91, the first bracket 81 is provided with a plurality of slits 811, whereas the first skirt portion 91 of the cover 91 is provided with two tongue pieces 911 to be fitted into the slits 811, with a spacing therebetween. The tongue piece 911 is bent outwards by an angle exceeding 90 degrees, from the lower end of the first skirt portion 91. With this arrangement, when the cover 90 is attached, the tongue piece 911 will be inclined such that the leading end of this tongue piece 911 will be disposed afloat above the top plate 90*a* of the mower deck 80, thus making inadvertent withdrawal of the tongue 911 from the slit 811 difficult.

As the attaching profile between the cover 90 and the second bracket 82, at the lower end portion of the second skirt portion 92, there is formed an inclined extension portion 921 extending outwards. And, the upper face of this inclined extension portion 921 is formed as an inclined face. The second bracket 82 is formed as a clamping deck for clamping the inclined extension portion 921 in cooperation with the top plate 80*a* of the mower deck 80. The second bracket 82 includes a base plate portion 821 and two inclined arm pieces 822 protruding from one end of the base plate portion 821. The base plate portion 821 has an approximately rectangular plate-like member and is fixed to the top plate 80*a* via a bolt. The inclined arm piece 822 consists of a transition portion 822*a* extending continuously from the one end of the base plate portion 821 and a guiding portion 822*b* extending from this transition portion 822*a*. The inclined arm piece 822 is inclined upwards, with the transmission portion 822*a* having an inclination angle greater than an inclination angle of the guiding portion 822*b*. The inner face of the guiding portion 822*b* has a substantially equal inclination angle to the upper face of the inclined extension portion 921. At the time of attachment of the cover 90, the inclined extension portion 921 will be fitted into a wedge-like space formed by the guiding portion 822*b* and the top plate 80*a* and the inclined extension portion 821 will be retained on the top plate 80*a* by a clamping force provided by the inclined arm pieces 822.

In this embodiment, only one second bracket 82 is provided for clamping the inclined extension portion 921. Instead, a plurality thereof can also be provided. Further, the tongue pieces 911 and the slits 811 can respectively be provided by three or only of them may be provided respectively.

The invention claimed is:

1. A work vehicle comprising:
   a frame unit extending along a vehicle body front-rear direction;
   a first drive wheel mounted to the frame unit on one side in a vehicle body transverse direction;
   a second drive wheel mounted to the frame unit on the other side in the vehicle body transverse direction;
   a driver's seat supported to the frame unit;
   a first hydraulic stepless speed changing device mounted to the frame unit on one side in the vehicle body transverse direction and configured to transmit power to the first drive wheel;
   a second hydraulic stepless speed changing device mounted to the frame unit on the other side in the vehicle body transverse direction and configured to transmit power to the second drive wheel;
   an engine mounted to the frame unit rearwardly of the driver's seat;
   a battery mounted to the frame unit rearwardly of the driver's seat;
   a fuel tank mounted to the frame unit downwardly of the driver's seat;
   a hydraulic stepless speed changing device oil tank mounted to the frame unit on one side in the vehicle body transverse direction;
   a first hydraulic passage connecting the hydraulic stepless speed changing device oil tank to the first hydraulic stepless speed changing device;
   a second hydraulic passage extending from one side to the other side of the frame unit in the vehicle body transverse direction, thus connecting the hydraulic stepless speed changing device oil tank to the second hydraulic stepless speed changing device;
   a cable harness extending from one side to the other side of the frame unit in the vehicle body transverse direction along the second hydraulic passage; and
   a bridge beam extending from one side to the other side of the frame unit in the vehicle body transverse direction between the second hydraulic passage and an electric wiring.

2. The work vehicle according to claim 1, wherein:
   the frame unit includes a first longitudinal frame and a second longitudinal frame that are connected to each other via a plurality of cross beams;
   the work vehicle further comprises a ROPS including a first leg portion supported to the first longitudinal frame, a second leg portion supported to the second longitudinal frame, and an arch-shaped portion connecting the first leg portion to the second leg portion.

3. The work vehicle according to claim 2, wherein the bridge beam connects the first leg portion to the second leg portion.

4. The work vehicle according to claim 2, wherein the bridge beam comprises one of the plurality of cross beams.

5. The work vehicle according to claim 1, wherein the bridge beam includes a plate portion having a front face oriented to the front side in the vehicle body front-rear direction and a rear face oriented to the rear side in the vehicle body front-rear direction, the cable harness being retained to the front face or the rear face, the second hydraulic passage being retained to the rear face or the front face.

6. The work vehicle according to claim 1, wherein an oil supply cylinder communicated to the fuel tank is disposed on the other side of the frame unit in the vehicle body transverse direction, and an oil supply opening of the oil supply cylinder is disposed laterally of the driver's seat.

7. The work vehicle according to claim 6, wherein the engine and the battery are disposed side by side in the vehicle body transverse direction.

8. The work vehicle according to claim 7, wherein a canister is disposed on the side opposite the battery across the engine.

9. The work vehicle according to claim 1, wherein a mower unit having at least one blade rotatably driven by power from the engine is mounted to the frame unit to be liftable up/down.

* * * * *

UNITED STATES PATENT AND TRADEMARK OFFICE
CERTIFICATE OF CORRECTION

PATENT NO. : 9,764,761 B2  
APPLICATION NO. : 15/019267  
DATED : September 19, 2017  
INVENTOR(S) : Masahiro Yamada et al.

Page 1 of 1

It is certified that error appears in the above-identified patent and that said Letters Patent is hereby corrected as shown below:

On the Title Page

Item (72) Inventors:
"Masahiro YAMADA, Norcross, GA (US); Barry JORDAN, Toccoa, GA (US); David SPITZ, Atlanta, GA (US)"

Should read:
-- Masahiro YAMADA, Norcross, GA (US); Barry JORDAN, Toccoa, GA (US); David SPITZ, Atlanta, GA (US); Akihito SUGIO, Osaka, Japan --.

Signed and Sealed this  
Tenth Day of July, 2018

Andrei Iancu  
*Director of the United States Patent and Trademark Office*